United States Patent [19]
Gunther

[11] 3,991,220
[45] Nov. 9, 1976

[54] PROCESS FOR PRODUCING A THIN DOUGH MATERIAL

[75] Inventor: Karl Günther, Vienna, Austria

[73] Assignee: Vereinigte Nahrungsmittelindustrie Aktiengesellschaft, Vienna, Austria

[22] Filed: Mar. 27, 1975

[21] Appl. No.: 562,673

Related U.S. Application Data

[62] Division of Ser. No. 319,394, Dec. 29, 1972, abandoned.

[30] Foreign Application Priority Data

Jan. 4, 1972 Austria .................................. 42/72

[52] U.S. Cl. .............................. 426/502; 426/556
[51] Int. Cl.² ........................................ A21D 10/00
[58] Field of Search ........... 426/549, 560, 556, 512, 426/517, 502

[56] References Cited
UNITED STATES PATENTS

| | | |
|---|---|---|
| 2,357,085 | 8/1944 | Cohen et al. ........................ 426/502 |
| 2,735,379 | 2/1956 | Stiles................................... 426/502 |
| 3,332,781 | 7/1967 | Benson et al. .................. 426/502 X |

*Primary Examiner*—Raymond N. Jones
*Attorney, Agent, or Firm*—Cushman, Darby & Cushman

[57] ABSTRACT

A method for producing strudel dough automatically. Dough is rolled in a first direction into a flat sheet, and then the flat sheet is stretched in a second direction transverse to the first direction while maintained stretched in the first direction. Then a predetermined amount of moisture until the dough has a moisture content of 17–20 is removed from the dough while it is maintained in its most stretched condition. The dough will then not have a tendency to snap back to its original shape, and will be suitable as strudel dough.

6 Claims, 5 Drawing Figures

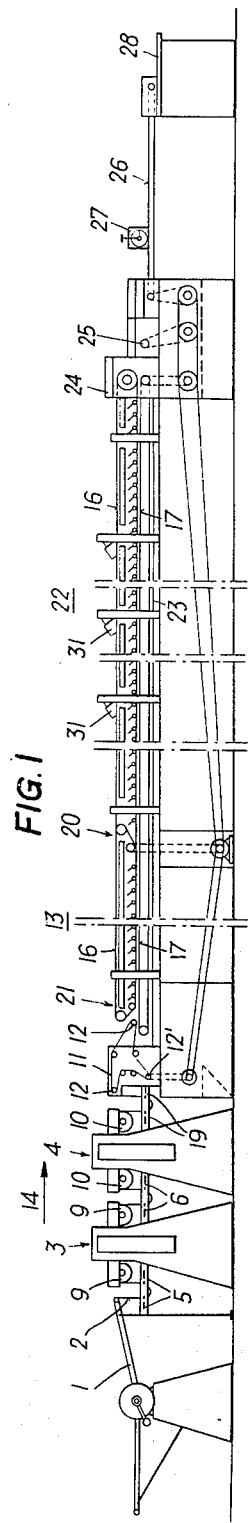
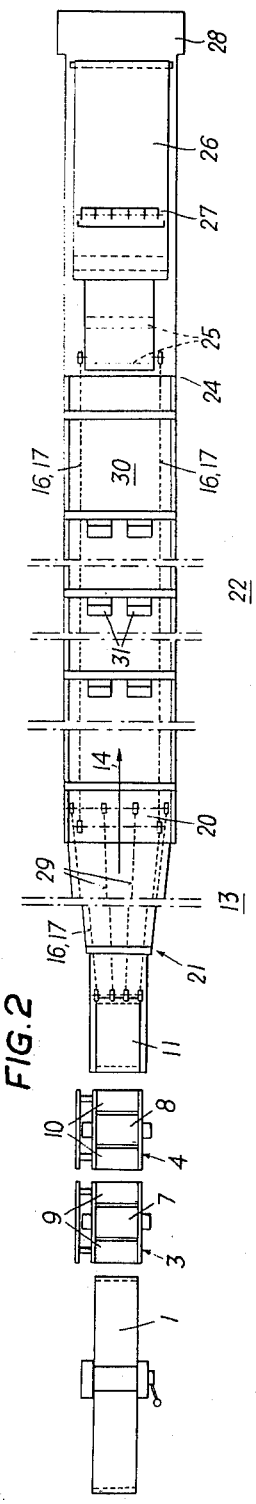
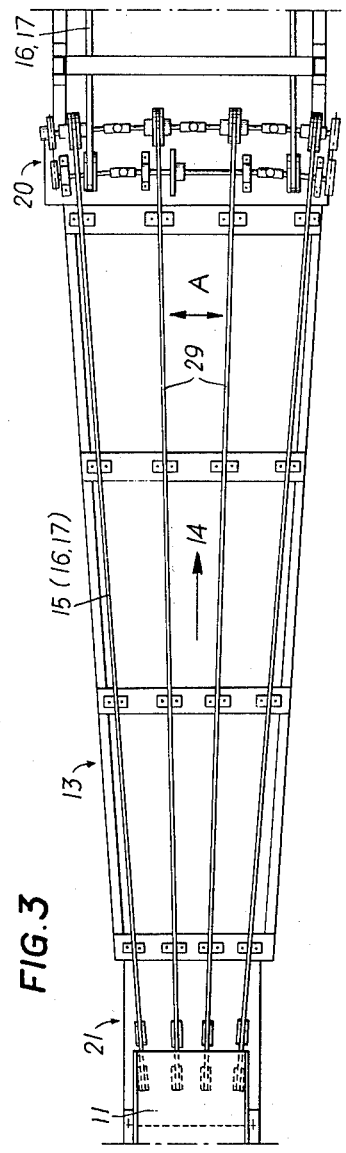

PROCESS FOR PRODUCING A THIN DOUGH MATERIAL

This is a division, of application Ser. No. 319,394 filed Dec. 29, 1972, now abandoned.

BACKGROUND OF THE INVENTION

The present invention relates to a process and an apparatus for producing a thin dough material from stretchable doughs, particularly doughs rich in gluten, e.g. for producing socalled "strudel" dough.

PRIOR TECHNIQUES

Such thin dough material has, as a rule, up until now been produced by first manually rolling a portion of dough and then manually stretching the rolled dough in all directions until the desired thickness, approximately 0.15 mm, of the stretched dough material has been obtained. When producing thin dough materials by rolling dough in machines, it was, however, not possible to produce a dough material having such a small thickness as when manually stretching pre-rolled dough material. When reducing the thickness of dough material by rolling, the dough materal is always stretched in the same direction and by stretching the dough in this manner, the structure of the dough respectively of the gluten network becomes disturbed or destroyed to such an extent that when rolling the dough material to the desired final thickness, a product is obtained which does not show the quality as expected of strudel dough. By rolling the dough the gluten network of the dough will be excessively elongated in one direction and with this the dough will lose its elasticity and become tough during baking instead of becoming crisp. Furthermore, rolling dough material down to a low thickness results in the drawback that components of the dough are expelled thereof. For producing thin dough material, e.g. strudel dough, of good quality one had to do with manual work.

OBJECTS AND SUMMARY OF THE INVENTION

The invention now aims at avoiding the mentioned drawbacks. The process for producing a thin dough material from stretchable doughs essentially consists in that the dough is formed in a manner known per se by rolling in one direction into a flat sheet having a thickness exceeding the thickness of the desired final product and that the sheet material obtained is subsequently extended only in the transverse direction or nearly only in the transverse direction to the rolling direction, whereupon the width of the stretched sheet of dough is maintained until the stretched sheet of dough has been at least partially dried, preferably the water content thereof has been lowered to about 17 to 20 percent by weight. By stretching the dough during rolling in the rolling direction, the gluten network will be elongated, however, such elongation does not have a detrimental effect on the gluten network because stretching of the dough by rolling is only effected to such an extent that the thickness of the dough material is still greater than the thickness of the final product. By extending or drawing the dough material subsequently to rolling in the transverse direction to the rolling direction, the gluten network is extended in this other direction in which the gluten network is still fully stretchable and will not become adversely affected. The rolled dough sheet can be extended in the transverse direction to such an extent that it has twice to three times, preferably 2 ½ times, the width of the rolled width.

By maintaining the width of the extended dough material until it has at least partially become dried, it is avoided that the still extendable and thus elastic dough material will reduce again its width.

In this manner, a final product can be produced which retains the necessary elasticity. The thin dough material respectively strudel dough produced becomes crisp and tenderly foliated on baking. By attaining the final thickness by a drawing process, the drawback can be avoided that components of the dough are expelled. The quality of the dough material obtained will be equal to the quality of a dough material produced by manually stretching or drawing dough.

It has been found that it is convenient to select such conditions that the time interval for continuously drawing or extending the dough approximately corresponds to one half of the time interval selected for seizing the dough sheet to maintain the width attained on drawing or extending the dough sheet. In this manner, drawing of the dough sheet will require such a time interval that extending or drawing is effected according to the stretchability of the dough without excessively stressing the gluten network. With this embodiment, it is also considered that the thin dough material, while being seized for maintaining its width attained on drawing, can respectively be heated and aerated for reducing the time interval necessary for drying the dough material while being seized, and thus for making the process more economic. While seizing the dough material in its final width, the dough material can be kept in contact with water absorptive material for removing water from the dough material and for simultaneously supporting the dough material and thus avoiding excessive stretching of this material under the influence of its own weight. According to the invention, the dough sheet is, while being extended or stretched or drawn in the transverse direction to the rolling direction and while being seized in its final width, moved in the rolling direction with a velocity corresponding to the rolling velocity in the last rolling stage.

Such a process makes it possible to mechanically produce thin dough materials, e.g. strudel dough, in an advantageous manner. An apparatus for performing a process according to the invention is essentially characterized in that seen in the rolling direction behind a rolling means, clamping means for seizing the edges of the dough sheet are guided along diverging paths and that the diverging paths have, as a continuation, parallel paths the distance of which approximately corresponds to the greatest distance between said diverging paths with the clamping means seizing the edges of the dough sheet being guided within said paths. Conveniently, the clamping means are positively moved in the feeding direction of dough sheet with a speed equal to the feeding speed of the dough sheet and it has been found advantageous to drive the clamping means guided along the diverging paths as well as the clamping means guided along said parallel paths by means of a drive means continuously adjustable in driving speed. A favorable drawing velocity in the transverse direction results when said paths are diverging for ⅓ to 1/7, preferably approximately for 1/5, of the length of the said paths.

According to a preferred embodiment of an apparatus according to the invention, the clamping means seizing the edges of the dough sheet are formed of pairs of belts or like paired members, the belts engaging the dough sheet at the area of the edges from above and from below and being driven with equal velocities in direction of the paths. These pairs of belts or like paired members can be formed by V-belts or by contacting plates connected to a chain, the surfaces of said members cooperating with the dough sheet optionally being provided with a cover of felt or fiber material for enabling these members to correctly seize the dough sheet and for avoiding any sticking on the dough sheet. The dough sheet extended in the transverse direction and to be retained in its extended width can be transmitted from the drawing station to the width stabilizing station by arranging the diverging pairs of belts with its ends having the greatest distance laterally outwardly of the parallel arranged pairs of belts.

The stretched dough sheet, after having been sufficiently dried and thus having become dimensionally stable to such an extent that it can be released by the clamping means, may be subdivided in a manner known per se by cutting means, whereupon the dough portions obtained may be, after optional folding, mechanically or manually packed up.

BRIEF DESCRIPTION OF THE DRAWINGS

The invention is further illustrated with reference to the drawing illustrating several embodiments.

FIGS. 1 and 2 represent an embodiment of an apparatus according to the invention, with FIG. 1 being a side elevation and FIG. 2 a top plan view, FIG. 3 shows, on a larger scale and in a top plan view, the drawing station for drawing the dough in an apparatus according to FIGS. 1 and 2.

DETAILED DESCRIPTION OF THE INVENTION

Figure 4:
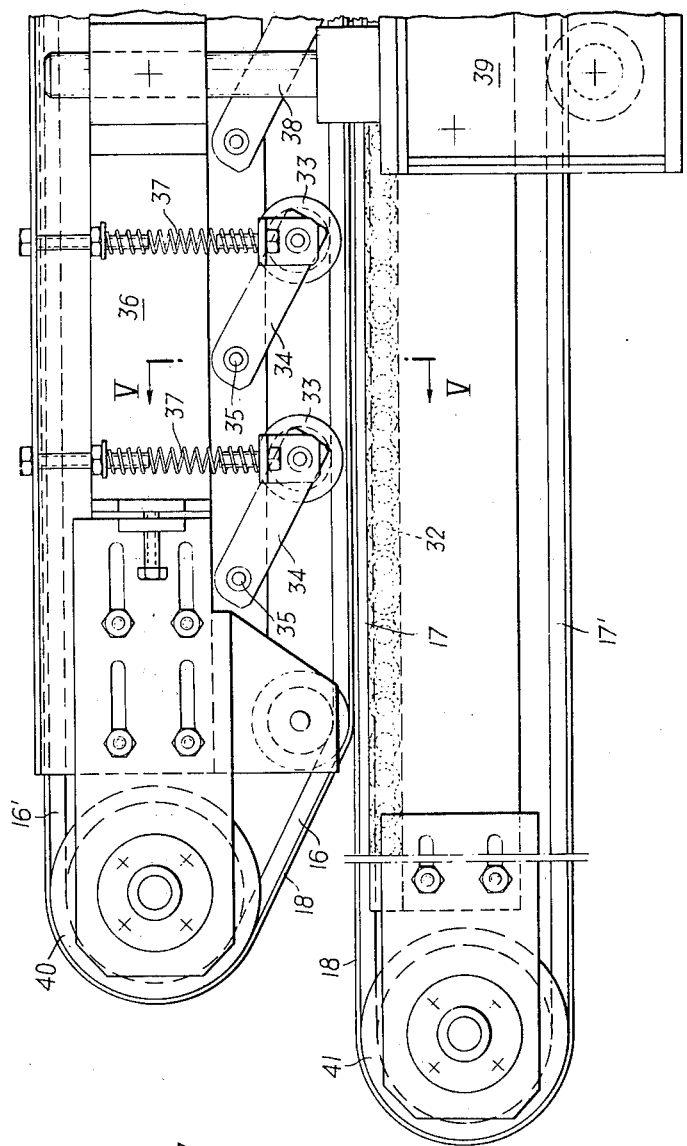
FIG. 4 shows on a still larger scale the guiding means for the belts forming the clamping means, with FIG. 4 being a side elevation and FIG. 5 a cross section along the line V—V of FIG. 4.
Figure 5:
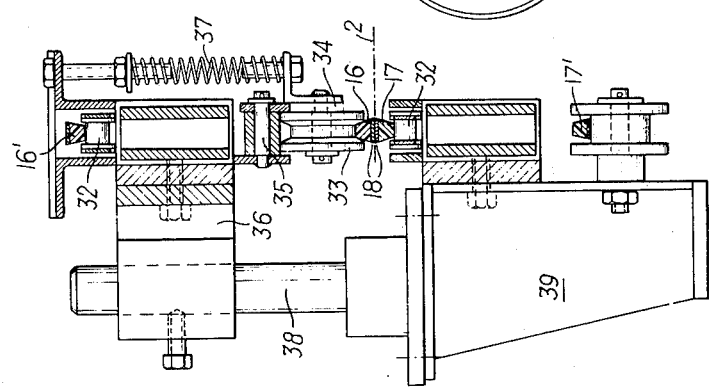

A pre-rolled dough sheet 2 is fed from a rolling station 1, and a conveyor belt to rolling stations 3 and 4. In correspondance to the gradual decrease of the thickness of the dough sheet, the rolling speed in the subsequent rolling stations 3 and 4 is to be increased. The rolling speed is controlled by light barriers 5, 6 and 19, in which the sagging dough sheet 2 shuts off a light beam. The dough sheet 2 is further rolled in these rolling stations 3 and 4 by roll pairs 7 and 8. Before and after each roll pair 7 and 8 the dough sheet 2 is passing guide rolls 9 and 10, respectively. A conveyor belt 11 running over rolls 12 and a driven roll 12' is conveying the dough sheet 2, which has been rolled in the rolling stations 3 and 4 down to a thickness of about 0.4 mm, into a drawing station 13 within which the dough sheet is stretched in the direction of arrows 14 (the rolling direction), and in a direction A transverse to the rolling direction. In this drawing station 13, clamping means seizing the edges of the dough sheet 2 are guided along diverging paths 15. As is shown in FIGS. 4 and 5 on a greater scale, these clamping means are formed of pairs of V-belts comprising an upper V-belt 16 and a lower V-belt 17. These V-belts are provided at their surfaces engaging the edges of the dough sheet 2 with layers 18 of felt which is well suitable for seizing the dough without adhering thereto. In view of said pairs 16, 17 of V-belts being guided along diverging paths 15, the dough sheet is being stretched in a transverse direction to the rolling direction 14 according to the divergence of the diverging paths. The conveyor belt 11, the clamping means in the drawing station 13 and the clamping means in a stabilizing station 22 are driven by a common continuously controllable drive means. The control of the rolling stations 1, 3 and 4 is effected by light barriers. The distance of the diverging paths 15 at output end 20 is approximately 2 ½ times the distance of the input end. The dough sheet 2 is thus stretched in the transverse direction to approximately 2 ½ times its original width so that the thickness of the dough sheet at the output end 20 is approximately 0.15 mm.

At the output end 20 of the drawing station, the dough sheet extended in a transverse direction is transmitted to the stabilizing station 22 in which pairs of V-belts 16, 17 of the same construction as in the drawing station clamp the edges of the dough sheet 2 and are moved aong parallel paths 23. Transmission of the dough sheet from the drawing station 13 to the stabilizing station 22 can simply be effected by arranging the diverging pairs of belts 16, 17 such that the most distant portion of the belts of the drawing station are located laterally outwardly of the ends of the paths 23 at the transmitting area 20. The stretched dough sheet 2 is now fed to output end 24 by the pairs of belts 16, 17 moved along said paths 23. The width of the stretched dough sheet is maintained constant by the pairs of belts clamping the edges thereof. The conveying speed within the stabilizing station 22 is again adjusted such that the dough sheet 2 is moved in the rolling direction 14 with the same speed as in the drawing station 13. Within the stabilizing station the dough sheet is dried to such an extent that the width of the dough sheet will become stabilized. The dough sheet now stabilized is passing guide rolls 25 and then fed onto a belt conveyor 26, where a cutting means 27 is provided by which the dough sheet is subdivided in the transverse and longitudinal directions. The dough material portions obtained by cutting the dough sheet are fed to a packing station 28.

At the drawing station 13, between the diverging paths 15, additional belts 29 are provided for supporting the dough sheet with said belts 29 being driven with a speed having the same speed component in the rolling direction 14 as have the belts 16, 17 running on paths 15 in the rolling direction. Within the stabilizing station 22, an endless band 30 of absorptive material, e.g. of felt, is provided on which the dough sheet is supported and which is moved with the same speed as the pairs of belt 16, 17 are moved along paths 23. This endless band 30 of felt promotes removal of water from the dough sheet. Furthermore, heating fans 31 are provided above the felt band 30 for accelerating drying of the dough sheet 2.

In FIGS. 4 and 5 is shown how the pairs of belts 16, 17 are guided, noting that the input end of the stabilizing station 22 is shown on an enlarged scale at the transmitting area 20. The arrangement shown applies as well for the belts 16, 17 within the drawing station 13 as well as for the belts 16, 17 in the stabilizing station 22. The lower belt 17 is supported by a roller chain 32 of usual construction, with the roller chain 32 being stationarily arranged and forming a roller path for belt 17. The upper belt 16 of the pair of belts is pressed in a direction to the lower belt 17 by rollers 33 urged in a downward direction by spring members 37. These rollers 33 are rotatably supported on single-arm levers 34 which are, at 35, pivotally connected to a frame 36, with said levers 34 being loaded by said spring member 37. The frame 36 is connected to the base frame 39 of the apparatus by means of posts 38.

17' is the returning strand of belt 17 and 16' is the returning strand of belt 16. 40 is the return roller for the upper belt 16 and 41 is the return roller for the lower belt 17.

I claim:

1. A process for producing thin dough material from stretchable doughs, particularly doughs rich in gluten such as strudel dough, said process comprising the steps of
   a. rolling the gluten rich dough in a first direction into a flat sheet having a thickness exceeding the thickness of the final dough material to be produced,
   b. stretching said rolled dough sheet in a second direction substantially transverse to said first direction,
   c. maintaining said stretched rolled dough sheet in substantially its most stretched condition, and
   d. removing sufficient moisture from said dough sheet while it is maintained in its substantially most stretched condition, so that the dough sheet has a moisture content of 17–20 percent by weight.

2. A process as recited in claim 1 wherein said sheet is stretched in said second direction to such an extent that the width thereof is about 2 to 3 times the width of the rolled dough sheet before stretching thereof.

3. A process as recited in claim 1 wherein stretching of said dough sheet is accomplished in a first predetermined period of time, and wherein maintenance of said dough sheet in said stretched condition is effected for a second predetermined period of time, said second predetermined period of time being at least twice as great as said first predetermined period of time.

4. A process as recited in claim 1 wherein said step of removing a predetermined amount of moisture from said dough sheet is accomplished by blowing hot air thereon.

5. A process as recited in claim 4 wherein said step is removing a predetermined amount of water from said dough sheet is accomplished by contacting said sheet with an absorptive material.

6. A process as recited in claim 1 wherein said step of removing a predetermined amount of moisture from said sheet is further accomplished by contacting said sheet with an absorptive material.

* * * * *